US008736595B2

(12) United States Patent
Hirama

(10) Patent No.: US 8,736,595 B2
(45) Date of Patent: May 27, 2014

(54) DRIVING DEVICE AND DRIVING METHOD FOR IMAGE DISPLAY DEVICE

(75) Inventor: Atsushi Hirama, Tokyo (JP)

(73) Assignee: Oki Semiconductor Co., Ltd, Tokyo (JP)

( * ) Notice: Subject to any disclaimer, the term of this patent is extended or adjusted under 35 U.S.C. 154(b) by 1007 days.

(21) Appl. No.: 12/364,542

(22) Filed: Feb. 3, 2009

(65) Prior Publication Data

US 2009/0219276 A1 Sep. 3, 2009

(30) Foreign Application Priority Data

Mar. 3, 2008 (JP) ................................ 2008-051885

(51) Int. Cl.
*G09G 5/00* (2006.01)
*G06F 3/038* (2013.01)
*G09G 3/36* (2006.01)

(52) U.S. Cl.
CPC .......... *G09G 3/3688* (2013.01); *G09G 2320/02* (2013.01)
USPC .......................................................... 345/213

(58) Field of Classification Search
CPC .............. G09G 3/3685; G09G 3/3688; G09G 2320/02; G09G 2310/0291
See application file for complete search history.

(56) References Cited

U.S. PATENT DOCUMENTS

| | | | | |
|---|---|---|---|---|
| 4,618,814 | A * | 10/1986 | Kato et al. | 323/280 |
| 6,784,865 | B2 | 8/2004 | Akimoto et al. | |
| 2003/0151581 | A1 * | 8/2003 | Suyama et al. | 345/98 |
| 2005/0134246 | A1 * | 6/2005 | Tobita | 323/284 |
| 2008/0106330 | A1 * | 5/2008 | Yoshida et al. | 330/10 |

FOREIGN PATENT DOCUMENTS

| | | |
|---|---|---|
| JP | 2002-41001 | 2/2002 |

* cited by examiner

*Primary Examiner* — William Boddie
*Assistant Examiner* — Alecia D English
(74) *Attorney, Agent, or Firm* — Anthony P. Filomena; Taft Stettinius & Hollister, LLP

(57) ABSTRACT

A display driving device and method capable of canceling an offset voltage while suppressing a delay in outputting an image signal to the display device by the time required for the image signal to be completely received in the display device. In an exemplary embodiment, when an image signal is input to an operational amplifier, a pixel of the display device, to which a voltage based on the image signal is applied, and an output terminal of the operational amplifier are connected to each other. The image signal is input to the operational amplifier, and, when charges corresponding to an offset voltage generated in the operational amplifier have accumulated in a capacitor, the image signal is input to the operational amplifier together with the charges accumulated in the capacitor while the connection between the pixel and the output terminal of the operational amplifier is maintained.

6 Claims, 7 Drawing Sheets

DRIVING DEVICE AND DRIVING METHOD FOR IMAGE DISPLAY DEVICE

CROSS REFERENCE TO RELATED APPLICATION

This application claims the benefit of Japanese Patent Application No. 2008-051885, filed Mar. 3, 2008, which is incorporated by reference.

BACKGROUND

This disclosure relates to devices and methods for driving an image display device.

In a driving device for an image display device such as a thin film transistor ("TFT") liquid crystal panel, it is known to cancel an offset voltage of an operational amplifier using a capacitor when an image signal is output to interconnection lines (e.g., data lines of the TFT liquid crystal panel). See, e.g., Japanese Patent Application Laid-Open No. 2002-041001, which is incorporated by reference.

FIGS. 6A and 6B illustrate a conventional configuration of a driving device designed to cancel an offset voltage of an operational amplifier by means of a capacitor. As illustrated in FIGS. 6A and 6B, the driving device 100 is includes an operational amplifier 102, a capacitor 104, an input terminal 106, and switches 108, 110, 112.

The operational amplifier 102 is configured to operate as a voltage follower. The capacitor 104 is capable of accumulating charges corresponding to an offset voltage generated in the operational amplifier 102 between two electrodes thereof, and one of the electrodes is connected to a non-inversion input terminal of the operational amplifier 102. The input terminal 106 receives an image signal to be displayed on an image display device (for example, a TFT liquid crystal panel).

The switch 108 is a SPST (single-pole/single-throw) switch and is configured to switch a connection between a data line 114 (used for displaying an image represented by the image signal) and an output terminal of the operational amplifier 102 between a connected state and a non-connected state. In FIGS. 6A and 6B, a pixel (cell) to which a voltage based on the image signal is applied by the operational amplifier 102 via the data line 114 is illustrated as the capacitor 116.

The switch 110 is a SPST switch and is configured to switch a connection between the other electrode of the capacitor 104 and an inversion input terminal of the operational amplifier 102 between a connected state and a non-connected state.

The switch 112 is a SPDT (single-pole/double-throw) switch and is configured to switch a connection between the input terminal 106 and the non-inversion input terminal of the operational amplifier 102 between a connected state and a non-connected state, while switching a connection between the other electrode of the capacitor 104 and the input terminal 106 between a connected state and a non-connected state.

The driving device 100 is provided with a signal output device (not shown) capable of outputting a switch control signal for controlling the switches 108, 110, and 112 to the switches 108, 110, and 112. When the switch control signal output from the signal output device is in an active state (for example, a high level), as illustrated in FIG. 6A, the output terminal of the operational amplifier 102 and the data line 114 are disconnected by the switch 108, the other electrode of the capacitor 104 and the inversion input terminal of the operational amplifier 102 are connected by the switch 110, and the input terminal 106 and the non-inversion input terminal of the operational amplifier 32 are connected by the switch 112, while the other electrode of the capacitor 104 and the input terminal 106 are disconnected by the switch 112.

On the other hand, when the switch control signal output from the signal output device is in a non-active state (for example, a low level), as illustrated in FIG. 6B, the output terminal of the operational amplifier 102 and the data line 114 are connected by the switch 108, the other electrode of the capacitor 104 and the inversion input terminal of the operational amplifier 102 are disconnected by the switch 110, and the input terminal 106 and the non-inversion input terminal of the operational amplifier 102 are disconncted by the switch 112, while the other electrode of the capacitor 104 and the input terminal 106 are connected by the switch 112.

As illustrated in FIG. 7, in the driving device 100 having such a configuration, before the image signal is input to the input terminal 106, the switch control signal is in a non-active state, and the switches 108, 110, and 112 are in their states as illustrated in FIGS. 6B. When the image signal is input to the input terminal 106 in such states, the switch control signal is put into an active state, and the switches 108, 110, and 112 are in their states as illustrated in FIG. 6A. As a result, an offset voltage of the operational amplifier 102 is applied to the capacitor 104, and, thus, charges corresponding to the offset voltage are accumulated in the capacitor 104.

As shown in FIG. 7, when the accumulation of the charges corresponding to the offset voltage in the capacitor 104 is completed, the switch control signal is put into a non-active state, and the switches 108, 110, and 112 are in their states as illustrated in FIG. 6B. As a result, the offset voltage of the operational amplifier 102 is canceled, and, at the same time, a voltage based on the image signal is applied to the capacitor 116 via the operational amplifier 102 and the data line 114 during a period from the start (in FIG. 7, denoted by "addressing start") of accumulation of the charges to the capacitor 116 corresponding to the voltage corresponding to the image signal input to the input terminal 106 to the completion (in FIG. 7, denoted by "addressing end") of accumulation of the charges corresponding to the voltage to the capacitor 116.

SUMMARY

Exemplary embodiments include a display driving device and method capable of canceling an offset voltage while suppressing a delay in outputting an image signal to the display device by the time required for the image signal to be completely received in the display device. In an exemplary embodiment, when an image signal is input to an operational amplifier, a pixel of the display device, to which a voltage based on the image signal is applied, and an output terminal of the operational amplifier are connected to each other. The image signal is input to the operational amplifier, and, when charges corresponding to an offset voltage generated in the operational amplifier have accumulated in a capacitor, the image signal is input to the operational amplifier together with the charges accumulated in the capacitor while the connection between the pixel and the output terminal of the operational amplifier is maintained.

In an aspect, a driving device for an image display device may include an operational amplifier configured to operate as a voltage follower; a capacitor configured to accumulate charges corresponding to an offset voltage generated in the operational amplifier; and a timing controller operative to connect a load associated with a pixel of an image display device to which a voltage based on an image signal is to be applied and an output terminal of the operational amplifier when the image signal is input to the operational amplifier, inputting the image signal to the operational amplifier, and, when the charges corresponding to the offset voltage have been accumulated in the capacitor, inputting the image signal to the operational amplifier together with the charges accumulated in the capacitor while the load and the output terminal of the operational amplifier remain connected.

In a detailed embodiment, the driving device may include a power supply for applying a predetermined voltage to the load before the load and the output terminal of the operational amplifier are connected to each other, and the timing controller may be configured to control the power supply such that application of the predetermined voltage to the load is stopped when the load and the output terminal of the operational amplifier have been connected to each other. In a further detailed embodiment, the power supply may include a switch, and the timing controller may be operative to control the switch such that application of the predetermined voltage to the load is stopped when the load and the output terminal of the operational amplifier have been connected to each other.

In a detailed embodiment, the capacitor may have a first electrode connected to a non-inversion input terminal of the operational amplifier; the driving device may include an input terminal to which the image signal is input, a first switch configured to switch a connection between the input terminal and the non-inversion input terminal between a connected state and a non-connected state, a second switch configured to switch a connection between the load and the output terminal of the operational amplifier between the connected state and the non-connected state, a third switch configured to switch a connection between a second electrode of the capacitor and the inversion input terminal of the operational amplifier between the connected state and the non-connected state, and a fourth switch configured to switch a connection between the second electrode of the capacitor and the input terminal between the connected state and the non-connected state; and the timing controller may be operative to control the first switch, the second switch, the third switch, and the fourth switch such that when the image signal is input to the operational amplifier, the input terminal and the non-inversion input terminal are put into the connected state, the load and the output terminal are put into the connected state, the second electrode of the capacitor and the inversion input terminal are put into the connected state, and the second electrode of the capacitor and the input terminal are put into the non-connected state, so that the image signal is input to the operational amplifier, while controlling control the first switch, the second switch, the third switch, and the fourth switch such that when the charges corresponding to the offset voltage have been accumulated in the capacitor, the input terminal and the non-inversion input terminal are put into the non-connected state, the load and the output terminal are maintained in the connected state, the second electrode of the capacitor and the inversion input terminal are put into the non-connected state, and the second electrode of the capacitor and the input terminal are put into the connected state, so that the image signal is input to the operational amplifier together with the charges accumulated in the capacitor. In a further detailed embodiment, the driving device may include a power supply for applying a predetermined voltage to the load before the load and the output terminal of the operational amplifier are connected to each other, and the timing controller may be configured to control the power supply such that application of the predetermined voltage to the load is stopped when the load and the output terminal of the operational amplifier have been connected to each other. In a further detailed embodiment, the power supply may include a switch, and the timing controller may be operative to control the switch such that application of the predetermined voltage to the load is stopped when the load and the output terminal of the operational amplifier have been connected to each other.

In an aspect, a driving device for an image display device, the driving device being controlled in accordance with an address period and a non-address period, the address period including a sampling period and an outputting period, may include an operational amplifier having a non-inversion input terminal, an inversion input terminal, and an amplifier output terminal connected to the inversion input terminal; a capacitor having a first end connected to the non-inversion input terminal; a first switch configured to put a signal input terminal and the non-inversion input terminal into a connected state during the sampling period while a second end of the capacitor and the inversion input terminal are put into the connected state during the sampling period, and to put the signal input terminal and the non-inversion input terminal into a non-connected state during the outputting period while the signal input terminal and the second end of the capacitor are put into the connected state during the outputting period; and a second switch configured to put a connection between the amplifier output terminal and a signal output terminal between the connected state for the addressing period and a non-connected state for the non-addressing period.

In an aspect, a method of driving an image display device may include connecting a load associated with a pixel of an image display device to which a voltage based on an image signal is to be applied and an output terminal of an operational amplifier configured to operate as a voltage follower to each other when the image signal is input to the operational amplifier; inputting the image signal to the operational amplifier; causing charges corresponding to an offset voltage generated in the operational amplifier to be accumulated in a capacitor; and inputting the image signal to the operational amplifier together with the charges accumulated in the capacitor while the load and the output terminal of the operational amplifier remain connected.

In an aspect, a driving device for an image display device may include an operational amplifier configured to operate as a voltage follower; a capacitor configured to accumulate charges corresponding to an offset voltage generated in the operational amplifier; and a control means for connecting a load associated with a pixel of an image display device to which a voltage based on an image signal is to be applied and an output terminal of the operational amplifier when the image signal is input to the operational amplifier, inputting the image signal to the operational amplifier, and, when the charges corresponding to the offset voltage have been accumulated in the capacitor, inputting the image signal to the operational amplifier together with the charges accumulated in the capacitor while the load and the output terminal of the operational amplifier remain connected.

BRIEF DESCRIPTION OF THE DRAWINGS

The detailed description refers to the figures in which.

DETAILED DESCRIPTION

Figure 6A:
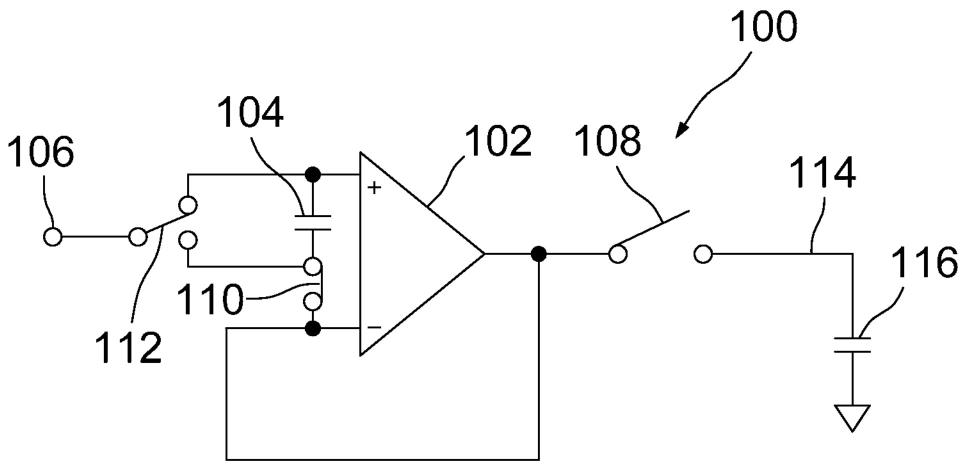
FIG. 6A PRIOR ART
FIGS. 6A and 6B are circuit diagrams illustrating a configuration of a conventional driving device and a peripheral configuration thereof.
Figure 6B:
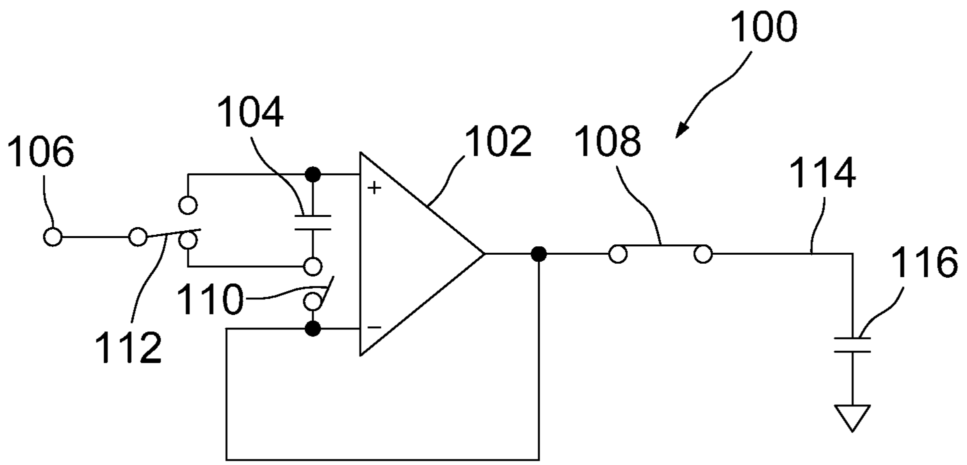
FIG. 6B PRIOR ART
Figure 7:
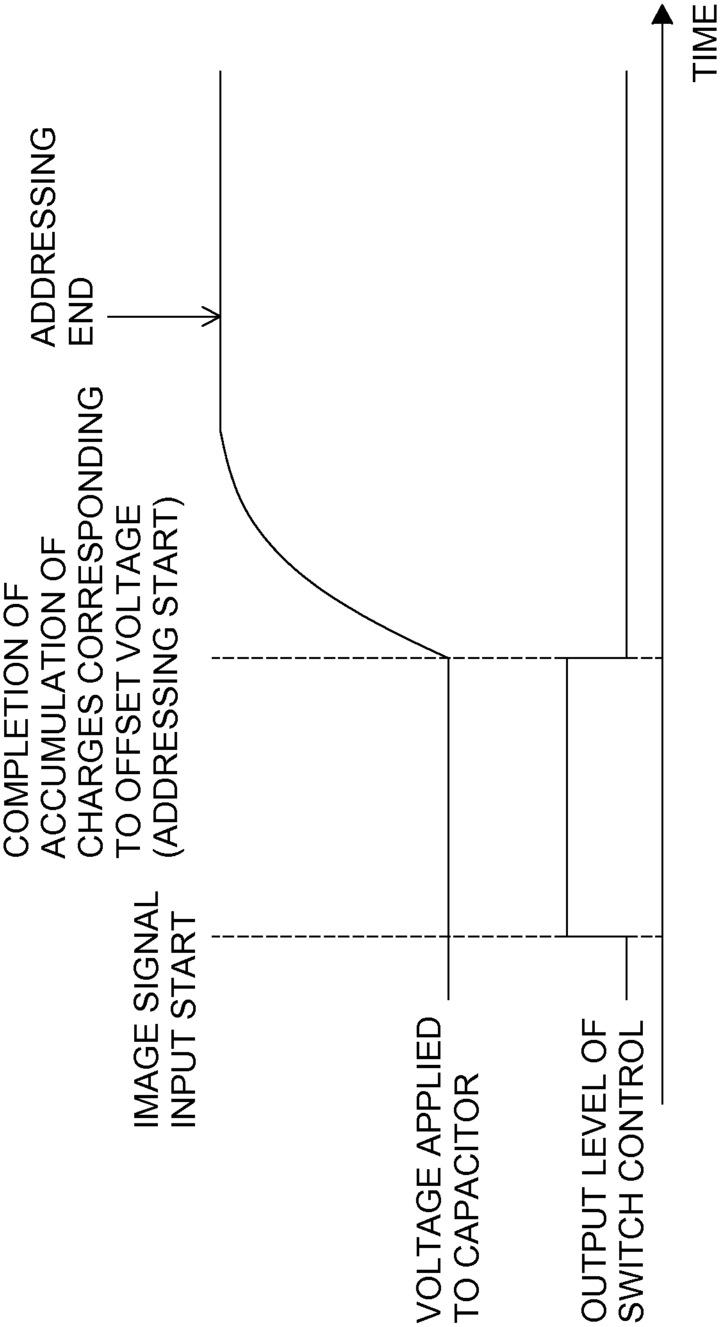
FIG. 7 PRIOR ART
FIG. 7 is a plot of voltage versus time illustrating the voltage applied to the capacitor and a state of a switch control signal for the conventional device of FIGS. 6A and 6B.

The present disclosure contemplates that, in the conventional device described above with reference to FIGS. 6A, 6B, and 7, during a period when the image signal is being received by the driving device 100 (when the switches 108, 110, and 112 are in their states as illustrated in FIG. 6A), the image signal is not yet output from the driving device 100 to the capacitor 116. In the conventional device, the outputting of the image signal from the driving device 100 to the capacitor 116 starts when the receipt of the image signal by the driving device 100 is completed (when the switches 108, 110, and 112 transition from the states as illustrated in FIG. 6A to the states as illustrated in FIG. 6B). Therefore, the outputting of the image signal to the capacitor 116 may be delayed by an amount of time corresponding to the time required for the image signal to be completely received in the driving device 100.

The present disclosure has been made in view of the above-described problem. The present disclosure includes an image display device driving device and a driving method capable of canceling an offset voltage while suppressing a delay in outputting of an image signal to the image display device by the amount of time corresponding to the time required for the image signal to be completely received in the image display device, where the image signal represents an image to be displayed in the image display device.

Figure 1:
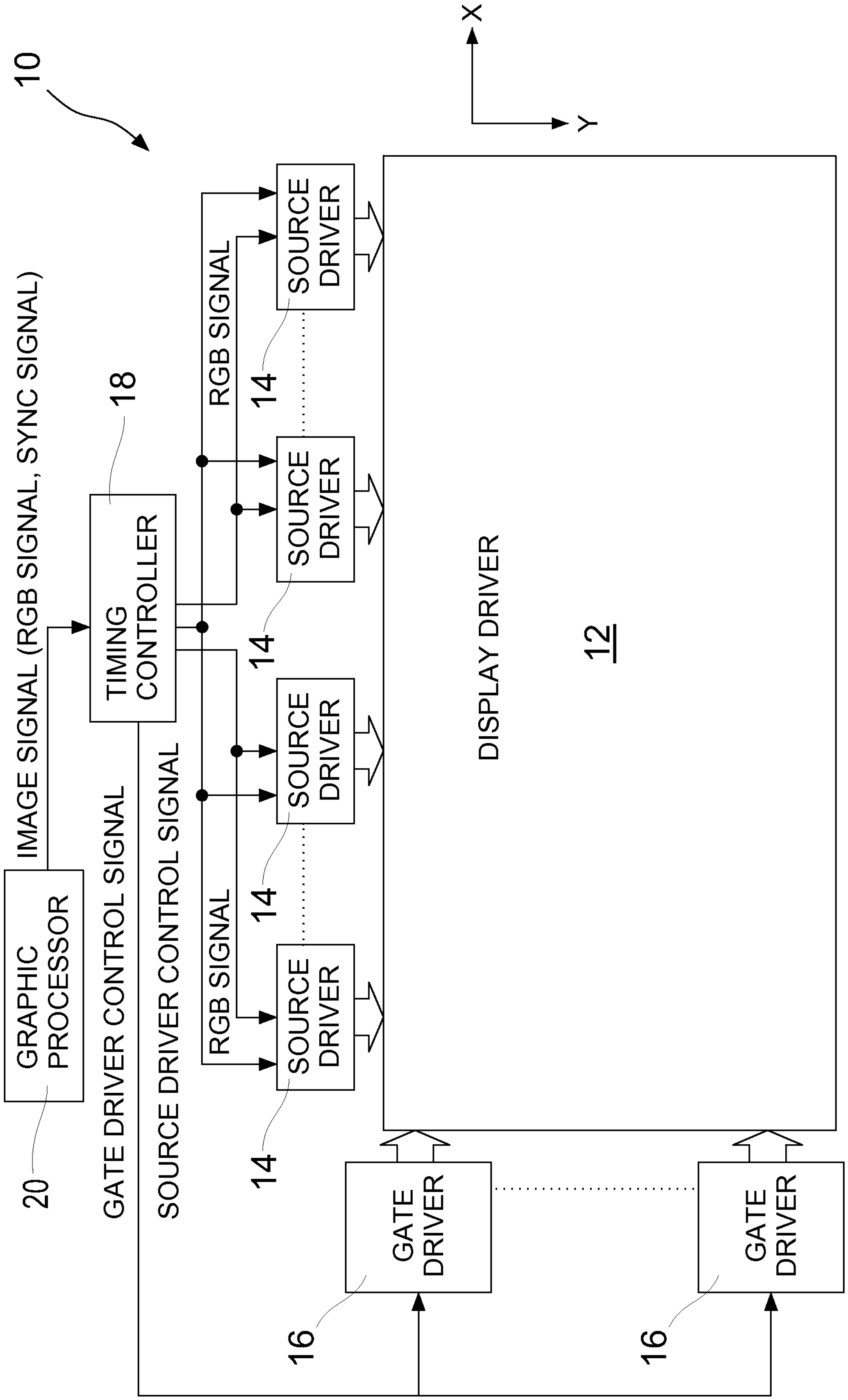
FIG. 1 is a block diagram illustrating a configuration of an image display device according to an exemplary embodiment.

Exemplary embodiments are described herein with reference to the accompanying drawings. FIG. 1 is a block diagram illustrating a configuration of an exemplary image display device 10. As illustrated in FIG. 1, the image display device 10 includes a display device 12 (for example, a TFT liquid crystal panel) and a peripheral circuit connected to the display device 12. In exemplary embodiments including a display device 12 comprising a TFT liquid crystal panel, liquid crystals are encapsulated between a pair of transparent substrates disposed opposite of each other at a predetermined distance. In such an exemplary embodiment, the display device 12 includes electrodes formed on an opposing surface of one of the transparent substrates, a plurality of data lines 30 (see FIGS. 2A to 2C) arranged on an opposing surface of the other transparent substrate at a predetermined interval along the X direction and extending in the Y direction, and a plurality of gate lines arranged at a predetermined interval along the Y direction and extending in the X direction. Furthermore, the display device 12 is provided with TFTs and electrodes formed at intersections (pixel positions) of the respective data lines 30 and the respective gate lines.

In an exemplary embodiment, each of the TFTs has a source connected to the electrode, a gate connected to the gate line, and a drain connected to the data line 30. Although the first exemplary embodiment is described with reference to a TFT liquid crystal panel as the image display device 10, other types of displays (such as, without limitation, a plasma display or an organic electroluminescent ("EL") display) are within the scope of this disclosure.

In an exemplary embodiment, the display device 12 includes a plurality of source drivers 14, and a respective one of the data lines 30 of the display device 12 is connected to one of the plurality of source drivers 14.

In an exemplary embodiment, the display device 12 includes a plurality of gate drivers 16 that are connected to a later-described timing controller 18. The timing controller 18 is connected to a later-described graphic processor 20.

In an exemplary embodiment, the graphic processor 20 is capable of holding an image signal representing an image to be displayed on the display device 12 by means of a frame memory or the like, and the graphic processor 20 is configured to output a sync signal to the timing controller 18 at predetermined cycles. The graphic processor 20 is configured to sequentially output an image signal (for example, an RGB signal representing a level of a data voltage to be supplied to the each of the data lines 30 of the display device 12) for one line of the display device 12 in the X direction from the image signal held therein at each cycle of the sync signal output to the timing controller 18.

In an exemplary embodiment, the timing controller 18 is configured to address the RGB signal for one line input from the graphic processor 20 to a memory (not illustrated) and to then read the RGB signal from the memory to be output to the source drivers 14. The source drivers 14 are configured to apply a data voltage (which corresponds to "a voltage based on the image signal" according to the present disclosure) of a level represented by the RGB signal input during a predetermined period (e.g., a later-described addressing period from "addressing start" to "addressing end") in accordance with a source driver control signal input from the timing controller 18 after the RGB signal of the data line 30 connected to thereto has been input from the timing controller 18.

In an exemplary embodiment, each of the gate lines of the display device 12 is connected to one of the gate drivers 16. The gate drivers 16 are configured to repeatedly supply a gate signal to the gate lines of the display device 12 for a predetermined period in accordance with a gate driver control signal input from the timing controller 18 while sequentially switching the gate lines to be supplied with the gate signal. When the gate signal is supplied to an arbitrary gate line, all of the TFTs for the line connected to the gate line are turned on, and data voltages supplied via the data lines 30 connected to respective TFTs are applied to the liquid crystals via respective electrodes, so that the light transmittance of the liquid crystals at each pixel position corresponding to the each of the turned-on TFTs may be changed. In this way, an image for one line of the display device 12 is displayed. When the above-described operations are repeated, an image is displayed on the display device 12.

Figure 2A:
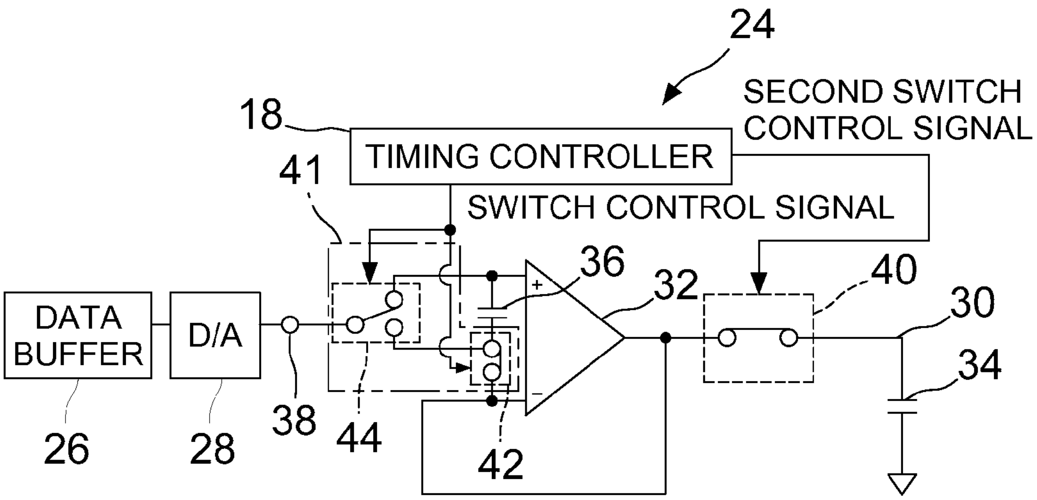
FIG. 2A is a circuit diagram illustrating a configuration of a driving device according to a first exemplary embodiment and an exemplary peripheral configuration thereof when a switch control signal and a second switch control signal are in an active state.
Figure 2B:
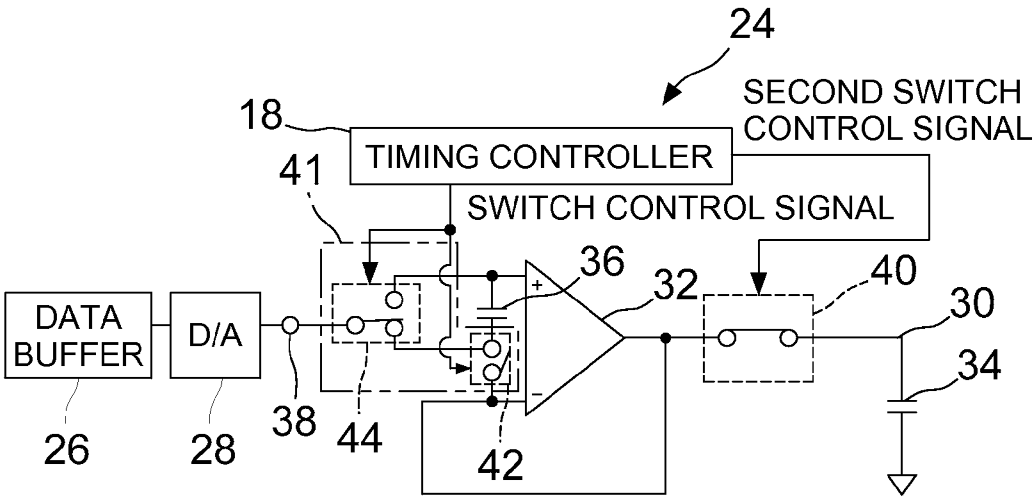
FIG. 2B is a circuit diagram illustrating the exemplary driving device of FIG. 2A when the switch control signal is in a non-active state and the second switch control signal is in an active state.
Figure 2C:
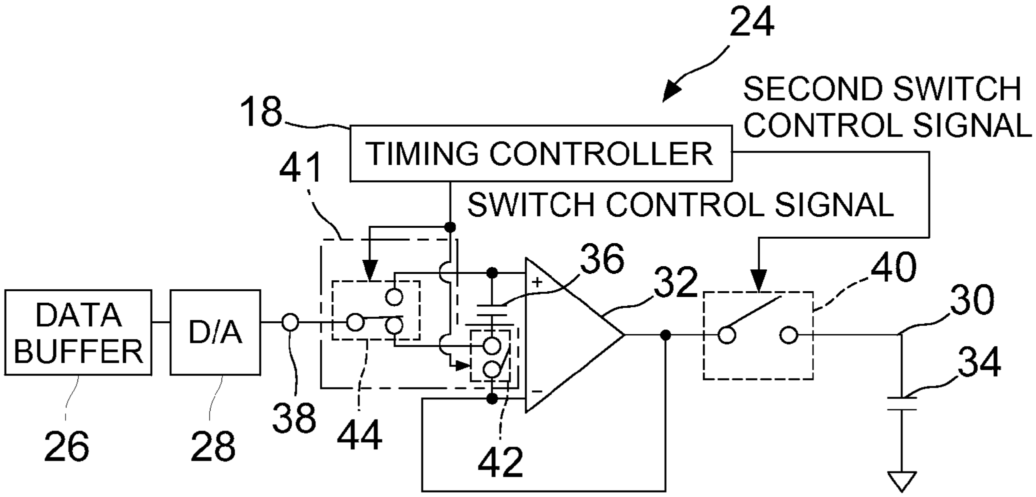
FIG. 2C is a circuit diagram illustrating the exemplary driving device of FIG. 2A when the switch control signal and the second switch control signal are in a non-active state.

As illustrated in FIGS. 2A to 2C, in an exemplary embodiment, each of the source drivers 14 is provided with a driving device 24 corresponding to one of the data lines 30 of the display device 12. The driving device 24 is controlled by the timing controller 18 in accordance with the addressing period (a non-addressing period being the remaining time).

In an exemplary embodiment, the driving device 24 is provided with a data buffer 26 configured to hold the RGB signal sent from the timing controller 18, a D/A (digital/analog) converter 28 capable of converting and outputting the RGB signal received from the data buffer 26 into an analog signal (hereinafter also referred to as "image signal") of a voltage level corresponding to a value of the RGB signal, and an operational amplifier 32 configured to operate as a voltage follower and having an output terminal connected to one of the data lines 30 of the display device 12 to thereby amplify the image signal input from the D/A converter 28 to be supplied to the data line 30. The data buffer 26, the D/A converter 28, and the operational amplifier 32 are connected in series with one another. In FIGS. 2A to 2C, a pixel (cell) to which the voltage based on the image signal input from the D/A converter 28 is applied by the operational amplifier 32 via the data line 30 is illustrated as a capacitor 34. The capacitor 34 has one electrode (a signal output terminal) connected to the data line 30, and the other electrode is grounded.

In an exemplary embodiment, the driving device 24 is further provided with a capacitor 36 and an input terminal 38. The capacitor 36 is configured to accumulate charges corresponding to an offset voltage generated in the operational amplifier 32, and the capacitor 36 has one (a first) electrode connected to a non-inversion input terminal of the operational amplifier 32. The input terminal 38 is connected to the output terminal of the D/A converter 28 and the image signal is input thereto from the D/A converter 28.

In an exemplary embodiment, the driving device 24 is further provided with a switch 40. The switch 40 is a SPST switch and is configured to switch a connection between the capacitor 34 and the output terminal of the operational amplifier 32 between a connected state and a non-connected state.

In an exemplary embodiment, the driving device 24 is further provided with a first switching circuit 41. The first switching circuit 41 is configured to include switches 42 and 44. The switch 42 is a SPST switch (in some exemplary embodiments, a SPDT switch may be used) and is configured to switch a connection between the other (a second) electrode of the capacitor 36 and the inversion input terminal of the operational amplifier 32 between a connected state and a non-connected state. The switch 44 is a SPDT switch and is configured to switch a connection between the input terminal 38 and the non-inversion input terminal of the operational amplifier 32 between a connected state and a non-connected state while switching a connection between the other electrode of the capacitor 36 and the input terminal 38 between a connected state and a non-connected state.

In an exemplary embodiment, the timing controller 18 is connected to the switches 40, 42, and 44 and is configured to generate a switch control signal for controlling the switches 42 and 44 and a second switch control signal for controlling the switch 40 so that the switch control signal and the second switch control signal are output to the switches 42 and 44 and the switch 40, respectively. In the first exemplary embodiment, the switch control signal and the second switch control signal are in either of a non-active state (e.g., a low level) or an active state (e.g., a high level).

Figure 3:
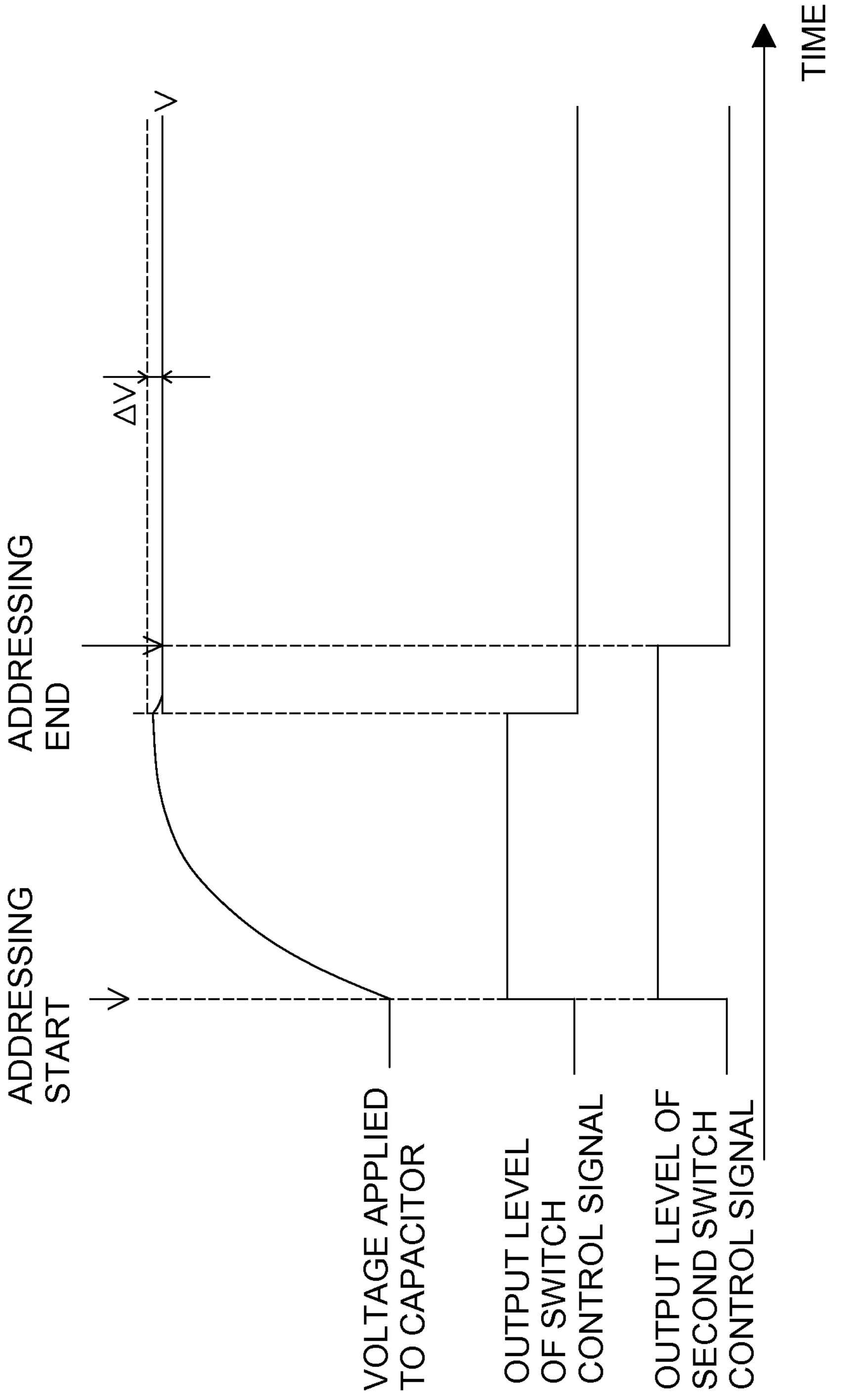
FIG. 3 is a plot of voltage versus time illustrating the voltage applied to the capacitor and states of the switch control signal and the second switch control signal according to the first exemplary embodiment.

A description of an exemplary operation of the driving device 24 according to the first exemplary embodiment refers to FIGS. 2A-2C and 3. First, the timing controller 18 causes the image signal to be output from the D/A converter 28 to the operational amplifier 32 while causing the switch control signal and the second switch control signal to transition from a non-active state to an active state, as illustrated in FIG. 3. With this operation, as illustrated in FIG. 2A, the switches 42 and 44 are controlled such that the other electrode of the capacitor 36 and the inversion input terminal of the operational amplifier 32 are put into a connected state, the input terminal 38 and the non-inversion input terminal of the operational amplifier 32 are put into a connected state, and the other electrode of the capacitor 36 and the input terminal 38 are put into a non-connected state. At the same time, the switch 40 is controlled such that the capacitor 34 and the output terminal of the operational amplifier 32 are put into a connected state.

The switch control signal and the second switch control signal transition from a non-active state to an active state, and, at the same time, application of the voltage based on the image signal input from the D/A converter 28 to the operational amplifier 32 to the capacitor 34 is started (in FIG. 3, denoted by "addressing start"). Moreover, charges corresponding to the offset voltage ΔV generated in the operational amplifier 32 are accumulated in the capacitor 36 during a period when the switch control signal is in an active state (during a sampling period when the image signal is being received in the operational amplifier 32). The image signal is then output from the output terminal of the operational amplifier 32 via the data line 30 to the capacitor 34 during a period when the second switch control signal is in an active state (during an outputting period when the image signal is being output from the operational amplifier 32 to the capacitor 34), so that charges corresponding to the voltage based on the image signal are accumulated in the capacitor 34.

Next, the timing controller 18 causes the switch control signal to transition from an active state to a non-active state as illustrated in FIG. 3 when a predetermined condition is satisfied. With this operation, as illustrated in FIG. 2B, the switches 42 and 44 are controlled such that the other electrode of the capacitor 36 and the inversion input terminal of the operational amplifier 32 are put into a non-connected state, the input terminal 38 and the non-inversion input terminal of the operational amplifier 32 are put into a non-connected state, and the other electrode of the capacitor 36 and the input terminal 38 are put into a connected state.

As a result, the offset voltage ΔV of the operational amplifier 32 is canceled, and, at the same time, the voltage based on the image signal having a target voltage level V (a voltage level of a signal input to the operational amplifier 32) is applied to the capacitor 34 before the charges corresponding to the voltage based on the image signal input from the D/A converter 28 to the operational amplifier 32 are completely accumulated in the capacitor 34 (in FIG. 3, denoted by "addressing end").

In the first exemplary embodiment, although a condition that a detector (not illustrated) has detected that the image signal has been input from the D/A converter 28 to the operational amplifier 32 and the charges corresponding to the offset voltage ΔV generated in the operational amplifier 32 have been accumulated in the capacitor 36 is used as the predetermined condition, it is within the scope of this disclosure that any condition indicating that a predetermined period has elapsed after the image signal has been input from the D/A converter 28 to the operational amplifier 32 may be used as the predetermined condition. For example, a time elapsed until the charges corresponding to the offset voltage ΔV generated in the operational amplifier 32 have been accumulated in the capacitor 36 after the image signal has been input from the D/A converter 28 to the operational amplifier 32 may be preliminarily estimated through computer simulation, and the estimated time may be used as the predetermined period.

Next, the timing controller 18 causes the second switch control signal to transition from an active state to a non-active state when a second predetermined condition is satisfied. With this operation, as illustrated in FIG. 2C, the switch 40 is controlled such that the capacitor 34 and the output terminal of the operational amplifier 32 are put into a non-connected state.

In the first exemplary embodiment, although a condition that a detector (not illustrated) has detected that the charges corresponding to the voltage based on the image signal input from the D/A converter 28 to the operational amplifier 32 have been accumulated in the capacitor 34 is used as the second predetermined condition, it is within the scope of this disclosure that any condition indicating that a second predetermined period has elapsed after the image signal has been input from the D/A converter 28 to the operational amplifier 32 may be used as the predetermined condition. For example, a time elapsed until the charges corresponding to the voltage based on the image signal have been accumulated in the capacitor 34 after the image signal has been input from the D/A converter 28 to the operational amplifier 32 may be preliminarily estimated through computer simulation, and the estimated time may be used as the second predetermined period.

As described above in detail, in the driving device 24 according to the first exemplary embodiment, the charges corresponding to the offset voltage generated in the operational amplifier 32 are accumulated in the capacitor 36. The control means (in this exemplary embodiment, the timing controller 18) is configured to connect the load (in this exemplary embodiment, the capacitor 34) arranged for each pixel of the image display device to which the voltage based on the image signal is applied and the output terminal of the operational amplifier 32 to each other whenever the image signal representing an image to be displayed to the display device 12 of the image display device 10 to be driven is input to the operational amplifier 32. The control means is configured to input the image signal to the operational amplifier 32. The control means is configured to input the image signal to the operational amplifier 32 together with the charges accumulated in the capacitor with the connection between the capacitor 34 and the output terminal of the operational amplifier 32 is maintained when the charges corresponding to the offset voltage generated in the operational amplifier 32 have been accumulated in the capacitor 36. Therefore, it is possible to output the image signal to the load while accumulating the charges corresponding to the offset voltage in the capacitor 36 and while canceling of the offset voltage in the operational amplifier 32. As a result, it is possible to cancel an offset voltage while suppressing a delay in outputting of the image signal to the image display device 12 by the time required for the image signal to be completely received.

Moreover, in the driving device 24 according to the first exemplary embodiment, the capacitor 36 has one electrode connected to the non-inversion input terminal of the operational amplifier 32. The driving device 24 is provided with the input terminal 38 to which the image signal is input, the first switching means (in this exemplary embodiment, the switch 44) for switching a connection between the input terminal 38 and the non-inversion input terminal of the operational amplifier 32 between a connected state and a non-connected state, the second switching means (in this exemplary embodiment, the switch 40) for switching a connection between the load and the output terminal of the operational amplifier 32 between a connected state and a non-connected state, the third switching means (in this exemplary embodiment, the switch 42) for switching a connection between the other electrode of the capacitor 36 and the inversion input terminal of the operational amplifier 32 between a connected state and a non-connected state, and the fourth switching means (in this exemplary embodiment, the switch 44) for switching a connection between the other electrode of the capacitor 36 and the input terminal 38 between a connected state and a non-connected state. The control means controls the first, second, third, and fourth switching means such that when the image signal is being input to the operational amplifier 32, the input terminal 38 and the non-inversion input terminal of the operational amplifier 32 are put into a connected state, the load and the output terminal of the operational amplifier 32 are put into a connected state, the other electrode of the capacitor 36 and the inversion input terminal of the operational amplifier 32 are put into a connected state, and the other electrode of the capacitor 36 and the input terminal 38 are put into a non-connected state, so that the image signal is input to the operational amplifier 32. The control means controls the first, second, third, and fourth switching means such that when the charges corresponding to the offset voltage generated in the operational amplifier 32 have been accumulated in the capacitor 36, the input terminal 38 and the non-inversion input terminal of the operational amplifier 32 are put into a non-connected state, the load and the output terminal of the operational amplifier 32 are maintained at the connected state, the other electrode of the capacitor 36 and the inversion input terminal of the operational amplifier 32 are put into a non-connected state, and the other electrode of the capacitor 36 and the input terminal 38 are put into a connected state, so that the image signal is input to the operational amplifier 32 together with the charges accumulated in the capacitor 36. Owing to this configuration, it is possible to cancel an offset voltage while suppressing a delay in outputting of the image signal to the image display device 12 by the time required for the image signal to be completely received at a low cost and in an assured manner.

A description of a second exemplary embodiment of the present invention is provided hereinbelow. In the second exemplary embodiment, the same or similar components or portions as in the first exemplary embodiment are denoted by the same reference numerals, and a redundant description thereof is omitted.

Figure 4A:
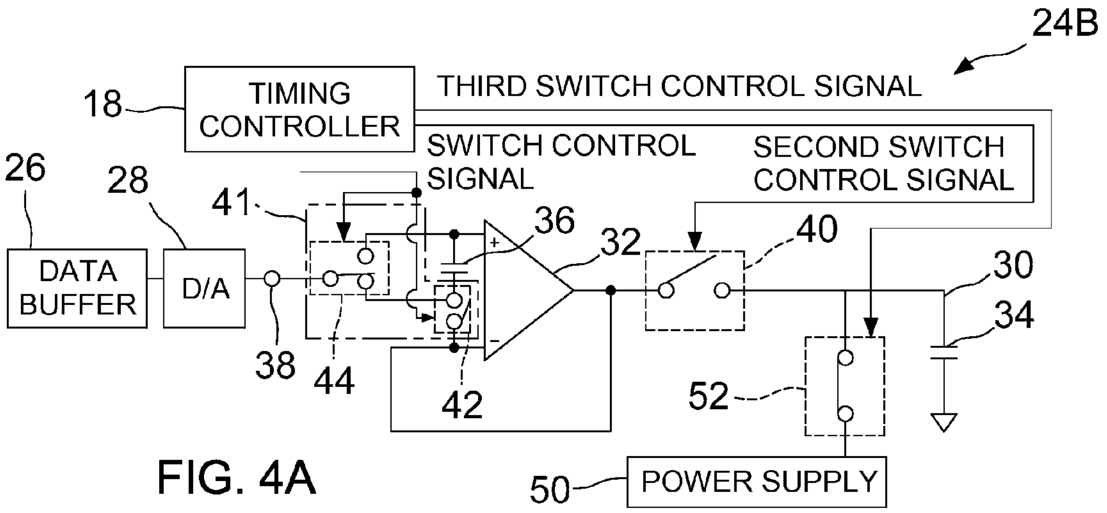
FIG. 4A is a circuit diagram illustrating a configuration of a driving device according to a second exemplary embodiment and an exemplary peripheral configuration thereof when a switch control signal is in a non-active state, a second switch control signal is in a non-active state, and a third switch control signal is in an active state.
Figure 4B:
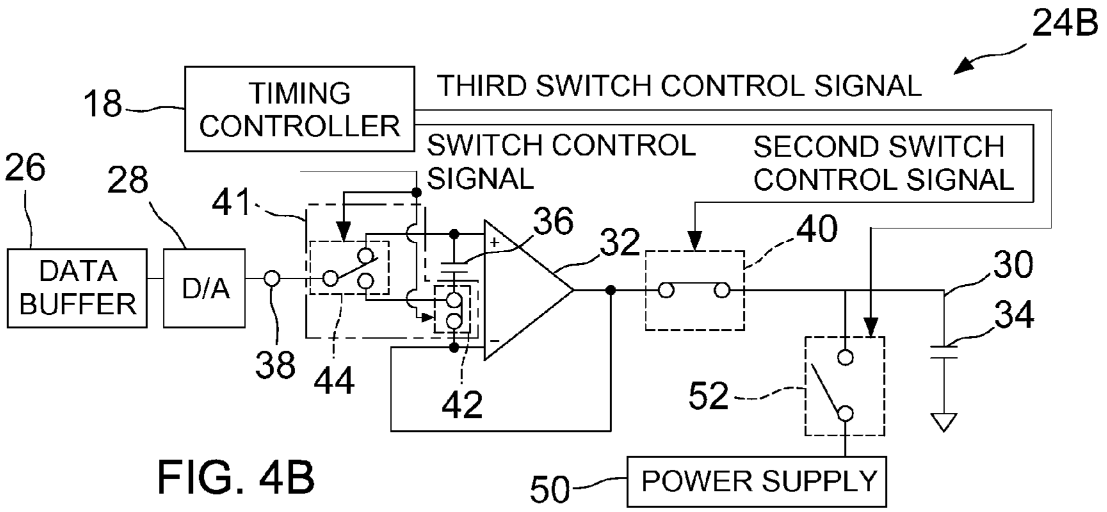
FIG. 4B is a circuit diagram illustrating the exemplary driving device of FIG. 4A when the switch control signal is in an active state, the second switch control signal is in an active state, and the third switch control signal is in a non-active state.
Figure 4C:
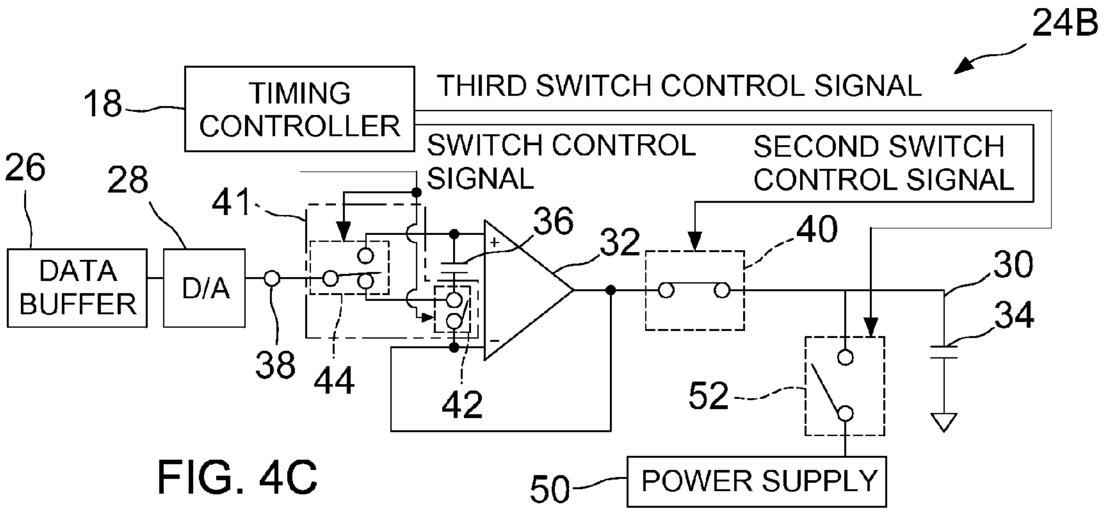
FIG. 4C is a circuit diagram illustrating the exemplary driving device of FIG. 4A when the switch control signal, the second switch control signal, and the third switch control signal are in a non-active state.

FIGS. 4A to 4C are circuit diagrams illustrating a configuration of a driving device 24B according to a second exemplary embodiment and a peripheral configuration thereof. As illustrated in FIGS. 4A to 4C, the driving device 24B differs from the driving device 24 according to the first exemplary embodiment in that the driving device 24B is further provided with a power supply 50 and a switch 52. An output terminal of the power supply 50 is connected to the capacitor 34 via the switch 52 and the data line 30. The power supply 50 is configured to apply a voltage of a voltage level VM lower than the above-described voltage level V to the capacitor 34. The switch 52 is a SPST switch and is configured to switch a connection between the output terminal of the power supply 50 and the capacitor 34 between a connected state and a non-connected state.

The timing controller 18 is connected to the switch 52 and is configured to generate a third switch control signal for controlling the switch 52 so that the third switch control signal is output to the switch 52. In the second exemplary embodiment, the third switch control signal is in either of a non-active state (e.g., a low level) or an active state (e.g., a high level).

A description of an exemplary operation of the driving device 24B according to the second exemplary embodiment is provided with reference to FIGS. 4A-4C and 5. In the driving device 24B according to the second exemplary embodiment, the timing controller 18 causes the image signal to be output from the D/A converter 28 to the operational amplifier 32 while causing the switch control signal and the second switch control signal to be in a non-active state and the third switch control signal to be in an active state before the start of the application of the voltage based on the image signal to the capacitor 34 (in FIG. 5, denoted by "addressing start"). With this operation, as illustrated in FIG. 4A, the switches 40, 42, 44, and 52 are controlled such that the capacitor 34 and the output terminal of the operational amplifier 32 are put into a non-connected state, the other end of the capacitor 36 and the inversion input terminal of the operational amplifier 32 are put into a non-connected state, the input terminal 38 and the non-inversion input terminal of the operational amplifier 32 are put into a non-connected state, the other electrode of the capacitor 36 and the input terminal 38 are put into a connected state, and the output terminal of the power supply 50 and the capacitor 34 are put into a connected state.

As a result, the voltage of a voltage level VM is applied from the power supply 50 via the data line 30 to the capacitor 34 during a period when the switch control signal and the second switch control signal are in a non-active state and the third switch control signal is in an active state.

Next, the timing controller 18 causes the image signal to be output from the D/A converter 28 to the operational amplifier 32 while causing the third switch control signal to transition from an active state to a non-active state and causing the switch control signal and the second switch control signal to transition from a non-active state to an active state. With this operation, as illustrated in FIG. 4B, the switches 40, 42, 44, and 52 are controlled such that the capacitor 34 and the output terminal of the operational amplifier 32 are put into a connected state, the other electrode of the capacitor 36 and the inversion input terminal of the operational amplifier 32 are put into a connected state, the input terminal 38 and the non-inversion input terminal of the operational amplifier 32 are put into a connected state, the other electrode of the capacitor 36 and the input terminal 38 are put into a non-connected state, and the output terminal of the power supply 50 and the capacitor 34 are put into a non-connected state.

The switch control signal and the second switch control signal transition from a non-active state to an active state, and, at the same time, application of the voltage based on the image signal input from the D/A converter 28 to the operational amplifier 32 to the capacitor 34 is started. Charges corresponding to the offset voltage ΔV generated in the operational amplifier 32 are accumulated in the capacitor 36 while the switch control signal is in an active state. The image signal is then output from the output terminal of the operational amplifier 32 via the data line 30 to the capacitor 34 while the second switch control signal is in an active state, so that the charges corresponding to the voltage based on the image signal are accumulated in the capacitor 34.

Next, the timing controller 18 causes the switch control signal to transition from an active state to a non-active state when a predetermined condition as described above with reference to the first exemplary embodiment is satisfied. With this operation, as illustrated in FIG. 4C, the switches 42 and 44 are controlled such that the other electrode of the capacitor 36 and the inversion input terminal of the operational amplifier 32 are put into a non-connected state, the input terminal 38 and the non-inversion input terminal of the operational amplifier 32 are put into a non-connected state, and the other electrode of the capacitor 36 and the input terminal 38 are put into a connected state.

Figure 5:
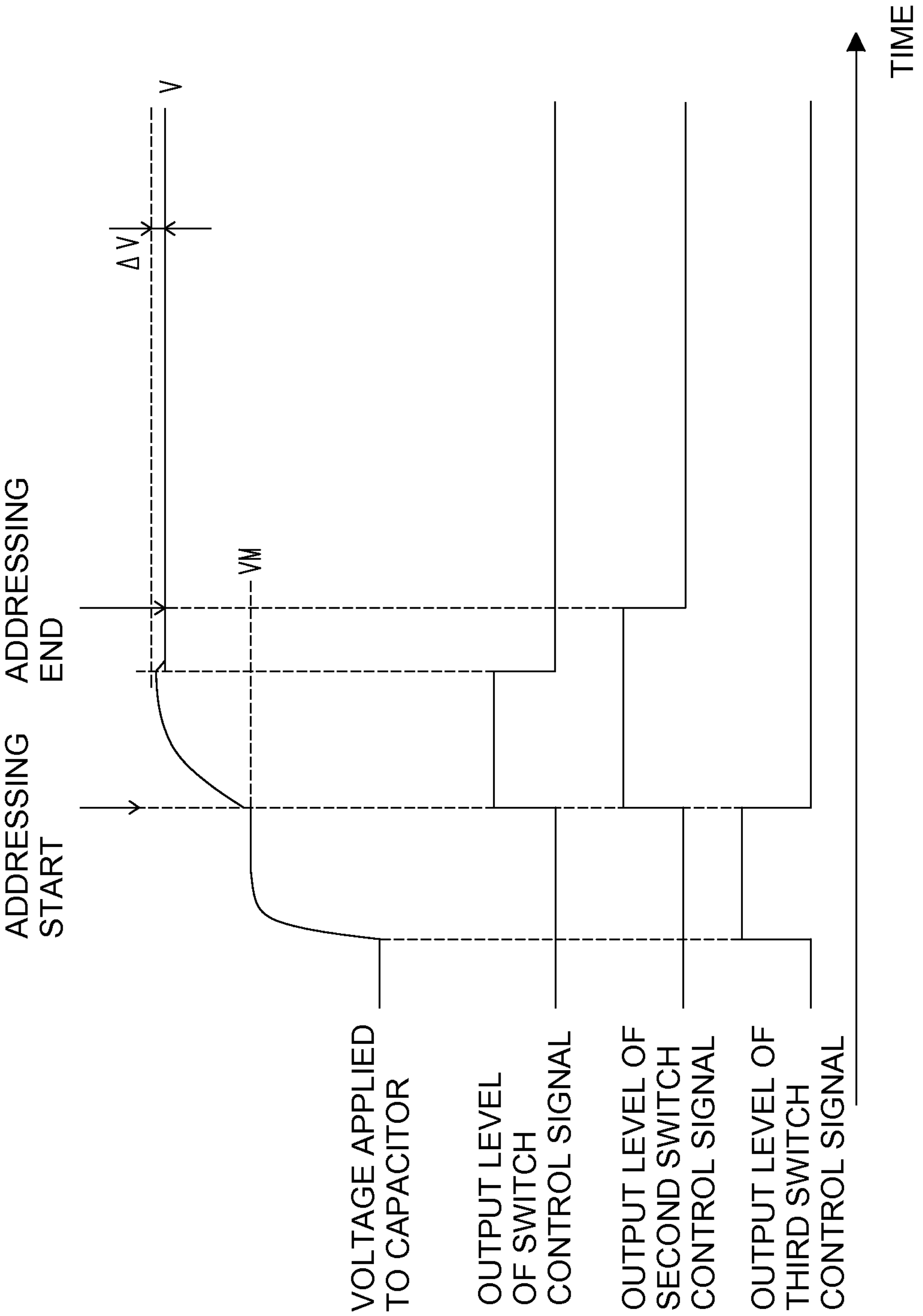
FIG. 5 is a plot of voltage versus time illustrating the voltage applied to the capacitor and states of the switch control signal, the second switch control signal, and the third switch control signal according to the second exemplary embodiment.

As a result, the offset voltage ΔV of the operational amplifier 32 is canceled, and, at the same time, the voltage based on the image signal having a target voltage level V (a voltage level of a signal input to the operational amplifier 32) is applied to the capacitor 34 before the charges corresponding to the voltage based on the image signal input from the D/A converter 28 to the operational amplifier 32 are completely accumulated in the capacitor 34 (in FIG. 5, denoted by "addressing end"). Moreover, in the second exemplary embodiment, since the voltage of a voltage level VM is applied to the capacitor 34 before the capacitor 34 is connected to the output terminal of the operational amplifier 32 (before the image signal is output from the D/A converter 28 to the operational amplifier 32), it is possible to cause the voltage level of the voltage applied to the capacitor 34 to more quickly reach the voltage level V than in the first exemplary embodiment. That is, it is possible to advance the occurrence of "addressing end" compared with the first exemplary embodiment.

Next, the timing controller 18 causes the second switch control signal to transition from an active state to a non-active state when a second predetermined condition as described above with reference to the first exemplary embodiment is satisfied, as illustrated in FIG. 5. With this operation, the switch 40 is controlled such that the capacitor 34 and the output terminal of the operational amplifier 32 are put into a non-connected state.

As described above in detail, in accordance with the driving device 24B according to the second exemplary embodiment, the display device 24B is further provided with the application means (e.g., the power supply 50 and the switch 52) for applying a predetermined voltage (e.g., a voltage of a voltage level VM) to the load before the load and the output terminal of the operational amplifier 32 are connected to each other, and the control means controls the application means such that the application of the predetermined voltage to the load is stopped when the load and the output terminal of the operational amplifier 32 have been connected to each other. Owing to this configuration, it is possible to more quickly complete the outputting of the image signal to the display device 12.

The disclosure hereinabove includes descriptions of exemplary embodiments. However, the technical scope of the disclosure is not limited to the scope of the exemplary embodiments. Various changes or improvements can be made to the exemplary embodiments without departing from the scope of this disclosure. The technical scope of the disclosure includes changes or the improvements to the exemplary embodiments.

Also, the exemplary embodiments described above do not limit the scope of the claims. All of the combinations of features described in the exemplary embodiments are not essential, and the exemplary embodiments are described at various stages. Various embodiments can be extracted by proper combinations of the plurality of constituent components depending on the circumstances. Even when some constituent components are omitted from the exemplary embodiments, as long as the effect of the device is obtained, a construction in which some constituent components are omitted falls within the scope of this disclosure.

For example, although the second exemplary embodiment has been described for a case where the application means includes the power supply 50 and the switch 52, the present disclosure is not limited to this configuration, and the application means may include only the power supply 50. In this case, the power supply 50 may be controlled such that the voltage is applied to the capacitor 34 when the second switch control signal is in an active state while the application of voltage to the capacitor 34 is stopped when the second switch control signal is in a non-active state.

Furthermore, it is to be understood that the configuration (see FIGS. 2A-2C) of the driving device 24 according to the first exemplary embodiment and the configuration (see FIGS. 4A-4C) of the driving device 24B according to the second exemplary embodiment are merely examples and may be modified without departing from the scope of the present disclosure.

While exemplary embodiments have been set forth above for the purpose of disclosure, modifications of the disclosed embodiments as well as other embodiments thereof may occur to those skilled in the art. Accordingly, it is to be understood that the disclosure is not limited to the above precise embodiments and that changes may be made without departing from the scope. Likewise, it is to be understood that it is not necessary to meet any or all of the stated advantages or objects disclosed herein to fall within the scope of the disclosure, since inherent and/or unforeseen advantages of the may exist even though they may not have been explicitly discussed herein.

What is claimed is:

1. A driving device for an image display device, the driving device comprising:

- an operational amplifier including a non-inversion input terminal, an inversion input terminal and an output terminal, the operational amplifier being configured to operate as a voltage follower;
- a capacitor having a first electrode and a second electrode, the first electrode being connected to the non-inversion input terminal of the operational amplifier, the capacitor being configured to accumulate charges corresponding to an offset voltage generated in the operational amplifier;
- an input terminal to which an image signal is input,
- a first switch configured to switch a connection between the input terminal and the non-inversion input terminal of the operational amplifier between a connected state and a non-connected state,
- a second switch configured to switch a connection between a load and the output terminal of the operational amplifier between a connected state and a non-connected state, the load being associated with a pixel of the image display device to which a voltage based on the image signal is to be applied,
- a third switch configured to switch a connection between the second electrode of the capacitor and the inversion input terminal of the operational amplifier between a connected state and a non-connected state,
- a fourth switch configured to switch a connection between the second electrode of the capacitor and the input terminal between a connected state and a non-connected state; and
- a timing controller for controlling the first switch, the second switch, the third switch, and the fourth switch, the timing controller configured to connect the load to the output terminal of the operational amplifier when the image signal is input to the operational amplifier, and, when the charges corresponding to the offset voltage have been accumulated in the capacitor, to connect the image signal to the operational amplifier together with the charges accumulated in the capacitor while the load and the output terminal of the operational amplifier remain connected;
- wherein the timing controller is controls the first switch, the second switch, the third switch, and the fourth switch such that when the image signal is input to the operational amplifier, the input terminal and the non-inversion input terminal are put into the connected state, the load and the output terminal are put into the connected state, the second electrode of the capacitor and the inversion input terminal are put into the connected state, and the second electrode of the capacitor and the input terminal are put into the non-connected state, so that the image signal is input to the operational amplifier, and
- such that when the charges corresponding to the offset voltage have been accumulated in the capacitor, the input terminal and the non-inversion input terminal are put into the non-connected state, the load and the output terminal are maintained in the connected state, the second electrode of the capacitor and the inversion input terminal are put into the non-connected state, and the second electrode of the capacitor and the input terminal are put into the connected state, so that the image signal is input to the operational amplifier together with the charges accumulated in the capacitor.

2. The driving device of claim 1, further comprising a power supply for applying a predetermined voltage to the load before the load and the output terminal of the operational amplifier are connected to each other,

- wherein the timing controller is configured to control the power supply such that application of the predetermined voltage to the load is stopped when the load and the output terminal of the operational amplifier have been connected to each other.

3. The driving device of claim 2, wherein the power supply includes a switch, and wherein the timing controller is operative to control the switch such that application of the predetermined voltage to the load is stopped when the load and the output terminal of the operational amplifier have been connected to each other.

4. A driving device for an image display device, the driving device being controlled in accordance with an address period and a non-address period, the address period including a sampling period and an outputting period, the driving device comprising:

- an operational amplifier having a non-inversion input terminal, an inversion input terminal, and an amplifier output terminal connected to the inversion input terminal;
- a capacitor having a first electrode and a second electrode, the first electrode being connected to the non-inversion input terminal of the operational amplifier, the capacitor being configured to accumulate charges corresponding to an offset voltage generated in the operational amplifier;
- an input terminal to which an image signal is input,
- a first switch configured to switch a connection between the input terminal and the non-inversion input terminal between a connected state and a non-connected state,
- a second switch configured to switch a connection between a load and the amplifier output terminal between a connected state and a non-connected state, the load being associated with a pixel of the image display device to which a voltage based on the image signal is to be applied;

a third switch configured to switch a connection between a second electrode of the capacitor and the inversion input terminal of the operational amplifier between a connected state and a non-connected state, a fourth switch configured to switch a connection between the second electrode of the capacitor and the input terminal between a connected state and a non-connected state; and a timing controller for controlling the first switch, the third switch, and the fourth switch such that in the sampling period when the image signal is input to the operational amplifier, the input terminal and the non-inversion input terminal are put into the connected state, the second electrode of the capacitor and the inversion input terminal are put into the connected state, and the second electrode of the capacitor and the input terminal are put into the non-connected state, so that the image signal is input to the operational amplifier, and for controlling the first switch, the third switch, and the fourth switch such that in the outputting period for outputting the image signal when the charges corresponding to the offset voltage have been accumulated in the capacitor, the input terminal and the non-inversion input terminal are put into the non-connected state, the second electrode of the capacitor and the inversion input terminal are put into the non-connected state, and the second electrode of the capacitor and the input terminal are put into the connected state, so that the image signal is input t6 the operational amplifier together with the charges accumulated in the capacitor, and controlling the second switch such that the load and the amplifier output terminal are put into the connected state in the address period, and the load and the amplifier output terminal are put into the non-connected state in the non-address period.

5. A method of driving an image display device comprising:

connecting a first electrode of a capacitor to a non-inversion input terminal of an operational amplifier to accumulate charges in the capacitor corresponding to an offset voltage generated in the operational amplifier, the operational amplifier being configured to operate as a voltage follower;

inputting an image signal to an input terminal;

switching a connection between the input terminal and the non-inversion input terminal between a connected state and a non-connected state using a first switch, switching a connection between a load and an output terminal of the operational amplifier between a connected state and a non-connected state using a second switch, the load being associated with a pixel of the image display device to which a voltage based on the image signal is to be applied, switching a connection between a second electrode of the capacitor and an inversion input terminal of the operational amplifier between a connected state and a non-connected state using a third switch, switching a connection between the second electrode of the capacitor and the input terminal between a connected state and a non-connected state using a fourth switch; and controlling the first switch, the second switch, the third switch, and the fourth switch using a timing controller such that when the image signal is input to the operational amplifier, the input terminal and the non-inversion input terminal are put into the connected state, the load and the output terminal of the operational amplifier are put into the connected state, the second electrode of the capacitor and the inversion input terminal are put into the connected state, and the second electrode of the capacitor and the input terminal are put into the non-connected state, so that the image signal is input to the operational amplifier, and such that when the changes corresponding to the offset voltage have been accumulated in the capacitor, the input terminal and the non-inversion input terminal are put into the non-connected state, the load and the output terminal are maintained in the connected state, the second electrode of the capacitor and the inversion input terminal are put into the non-connected state, and the second electrode of the capacitor and the input terminal are put into the connected state, so that the image signal is input to the operational amplifier together with the charges accumulated in the capacitor.

6. A driving device for an image display device, the driving device comprising:

an operational amplifier including a non-inversion input terminal, an inversion input terminal and an output terminal, the operational amplifier being configured to operate as a voltage follower;

a capacitor having a first electrode and a second electrode, the first electrode being connected to the non-inversion input terminal of the operational amplifier, the capacitor being configured to accumulate charges corresponding to an offset voltage generated in the operational amplifier;

an input terminal to which an image signal is input;

a first switch configured to switch a connection between the input terminal and the non-inversion input terminal of the operational amplifier between a connected state and a non-connected state;

a second switch configured to switch a connection between a load and the output terminal of the operational amplifier between a connected state and a non-connected state, the load being associated with a pixel of the image display device to which a voltage based on an image signal is to be applied;

a third switch configured to switch a connection between the second electrode of the capacitor and the inversion input terminal of the operational amplifier between a connected state and a non-connected state;

a fourth switch configured to switch a connection between the second electrode of the capacitor and the input terminal between a connected state and a non-connected state; and a control means configured to connect the load and an output terminal of the operational amplifier when the image signal is input to the operational amplifier, and, when the charges corresponding to the offset voltage have been accumulated in the capacitor, inputting the image signal to the operational amplifier together with the charges accumulated in the capacitor while the load and the output terminal of the operational amplifier remain connected;

wherein the control means is operative to control the first switch, the second switch, the third switch, and the fourth switch such that when the image signal is input to the operational amplifier, the input terminal and the non-inversion input terminal are put into the connected state, the load and the output terminal are put into the connected state, the second electrode of the capacitor and the inversion input terminal are put into the connected state, and the second electrode of the capacitor and the input terminal are put into the non-connected state, so that the image signal is input to the operational amplifier, and is operative to control the first switch, the second switch, the third switch, and the fourth switch such that when the charges corresponding to the offset voltage have been accumulated in the capacitor, the input terminal and the non-inversion input terminal are put into the non-connected state, the load and the output terminal are maintained in the connected state, the second electrode of the capacitor and the inversion input terminal are put into the non-connected state, and the second electrode of the capacitor and the input terminal are put into the connected state, so that the image signal is input to the operational amplifier together with the charges accumulated in the capacitor.

* * * * *